US007870172B1

(12) United States Patent
Sarma

(10) Patent No.: US 7,870,172 B1
(45) Date of Patent: Jan. 11, 2011

(54) FILE SYSTEM HAVING A HYBRID FILE SYSTEM FORMAT

(75) Inventor: Joydeep Sarma, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 408 days.

(21) Appl. No.: 11/317,940

(22) Filed: Dec. 22, 2005

(51) Int. Cl.
G06F 12/00 (2006.01)
G06F 17/30 (2006.01)
G06F 15/16 (2006.01)
G06F 9/00 (2006.01)
G06F 9/44 (2006.01)

(52) U.S. Cl. .................. 707/822; 709/203; 712/244
(58) Field of Classification Search .............. None
See application file for complete search history.

(56) References Cited

U.S. PATENT DOCUMENTS

| | | | | |
|---|---|---|---|---|
| 5,099,426 | A | * | 3/1992 | Carlgren et al. ............ 704/9 |
| 5,832,515 | A | | 11/1998 | Ledain et al. |
| 5,974,503 | A | * | 10/1999 | Venkatesh et al. .......... 711/114 |
| 6,021,408 | A | | 2/2000 | Ledain et al. |
| 2002/0156786 | A1 | * | 10/2002 | Martin et al. ............. 707/10 |
| 2003/0158852 | A1 | * | 8/2003 | Zoltan ..................... 707/100 |
| 2004/0024795 | A1 | * | 2/2004 | Hind et al. ............... 707/204 |
| 2004/0177219 | A1 | * | 9/2004 | Meehan et al. ............ 711/114 |
| 2005/0050106 | A1 | * | 3/2005 | Wenner et al. ........... 707/200 |
| 2005/0240558 | A1 | * | 10/2005 | Gil et al. .................. 707/1 |
| 2006/0059172 | A1 | * | 3/2006 | Devarakonda ............ 707/100 |

OTHER PUBLICATIONS

Sung Hoon Baek, Bong Wan Kim, Eui Joung Joung and Chong Won Park, Reliability and Performance of Hierarchical RAID with Multiple Controllers*, Aug. 2001, ACM, Proceedings of the twentieth annual ACM symposium on Principles of distributed computing, p. 246-254.*
Mendel Rosenblum and John K. Ousterhout, The design and implementation of a log-structured file system, Feb. 1992, ACM, ACM Trans. Computer System; vol. 10 No. 1, p. 26-52.*
Marshall K. McKusick and William N. Joy and Samuel J. Leffler and Robert S. Fabry, A fast file system for UNIX, Aug. 1984, ACM, ACM Trans. Computer System; vol. 2 No. 3, p. 181-197.*
Hendrikus Gerardus Petrus Bosch; Mixed Media File System; Jun. 25, 1999.*
*http://doc.utwente.nl/17919/1/t000000e.pdf; Jun. 25, 1999; Hendrikus Gerardus Petrus Bosch "Mixed Media File Systems".*

(Continued)

Primary Examiner—Neveen Abel Jalil
Assistant Examiner—Jermaine Mincey
(74) Attorney, Agent, or Firm—Blakely, Sokoloff, Taylor & Zafman LLP

(57) ABSTRACT

Embodiments of this invention disclose a file system having a hybrid file system format. The file system maintains certain data in two formats, thereby defining a hybrid file system format. In one exemplary application, the first format has properties favorable to write operations, e.g. a log-structured file system format, while the second format has properties favorable to read operations, e.g. an extent-based file system format. The data is stored in the first file system format and then asynchronously stored in the second file system format. The data stored in the second file system format are also updated asynchronously.

23 Claims, 9 Drawing Sheets

OTHER PUBLICATIONS

M Satyanarayanan; "A Survey of Distributed File Systems"; 1989; pp. 1-28.*

ClockWise: A Mixed-Media File System. Peter Bosch, Sape Mullender, Pierre Jansen. IEEE 1999.*

Thomas E. Anderson; Severless Network File System; 1996; ACM; vol. 14 Issue 1; pp. 41-79.*

Ailamaki, Anastassia, *Replication*, http://www.cs.cmu.edu/~natassa/courses/15-823/F02/papers/replication.pdf, printed on May 19, 2005, 6 pages.

Breitbart, Yuri et al., *Replication and Consistency: Being Lazy Helps Sometimes*, ACM SIGMOD Anthology, PODS 1997: 173-184, Copyright 1997 by AMC, Inc., http://www.informatik.uni-trier.de/~ley/db/conf/pods/BreitbartK97.html, printed on May 19, 2005, 3 pages.

Chundi, Parvathi et al., *Deferred Updates and Data Placement in Distributed Databases*, ACM SIGMOD Anthology, ICDE 1996: 469-476, Copyright 1996 by the Institute of Electrical and Electronic Engineers, Inc., (IEEE), http://www.informatik.uni-trier.de/~ley/db/conf/icde/ChundiRR96.html, printed on May 19, 2005, 3 pages.

Irun-Briz, Luis et al., *Lazy Recovery in a Hybrid Database Replication Protocol*, Instituto Tecnologico de Informatica, Universidad Politecnica de Valencia, 46022, Valencia, Spain, 14 pages.

Kaye, Robert, *Lazy Replication*, O'Reilly Open Source Convention, Portland Marriott Downtown, Portland, OR, Jul. 26-30, 2004, http://conferences.oreillynet.com/cs/os2004/view/e_sess/5480, printed on May 19, 2005, 1 page.

Irun-Briz, Luis et al., *COLUP: The Cautious Optimistic Lazy Update Protocol*, Instituto Tecnologico de Informatica, Universidad Politecnica de Valencia, 46071, Valencia, Spain, 14 pages.

Breitbart, Yuri et al., Update Propagation protocols for replicated Databases, International Conference on Management of Data, Proceedings of the 1999 AMC SIGMOD Internation Conference on Management of Data, Paper No: A105, ACM Press, New York, NY 25 pages.

* cited by examiner

FILE SYSTEM HAVING A HYBRID FILE SYSTEM FORMAT

TECHNICAL FIELD

At least one embodiment of the present invention pertains to storage systems, and in particular, to a method and apparatus for providing a file system having a hybrid file system format.

BACKGROUND

A file system is a programmatic entity that imposes structure on an address space of one or more physical or virtual storage devices, such as disks, so that an operating system may conveniently read and write data containers, such as files and blocks, and related metadata.

In non-journaling file systems, an interruption of a hard disk (e.g. due to loss of power) while the file system is writing metadata can cause the metadata to be incompletely written. Metadata is information about data, e.g. a location of the data or names of the files. When metadata is incompletely written, the description of the data is inconsistent with the data itself.

In a journaling file system, journaled metadata are kept to avoid file system errors and corruption. Journaling file systems write out a special file called a journal, which keeps track of transactions to the disk. Updates to the disk are then committed atomically. If power is suddenly interrupted, a given set of updates will have either been fully committed to the file system, in which case there is not a problem, and the file system can be used immediately, or the given set of updates will be marked as not yet fully committed, in which case the file system driver can read the journal and fix inconsistencies that occurred.

Log-structured file systems are generalizations of journaling file systems. In a log-structured file system, both file system metadata and file system data are journaled. This design allows for access to old versions of files whereas traditional journaling file systems may lose or corrupt file content due to disk errors.

Log structured file systems have a write out of place property, according to which, whenever a data block is modified, the modified data block is written to a new physical location on disk. Some log-structured file systems have a write anywhere property in which data and/or metadata do not have to be written to any particular location on disk. That is, the file system can write new data or metadata to any unallocated block on any available disk. This property makes it possible to perform random writes very efficiently.

This property, however, may also increase the likelihood that files written to disk will become fragmented over time. The likelihood of fragmentation is especially high for files subject to random write workloads, such as long-lived files used to store database data, since the random workloads cause the file data to be spread out over the disks. As fragmentation increases, sequential reads may become slower. Additionally, random reads may suffer from higher seek latencies since the data may spans across many cylinders of a disk drive, rather than being localized to a smaller set of cylinders, for example.

To alleviate a possible file fragmentation problem in write anywhere file systems, techniques have relied upon reallocating file data to lay out the file data continuously. In certain techniques, this reallocation is done as new file data is written. In other techniques, this reallocation is done as part of a disk defragmentation operation in which multiple fragmented files across a disk are reallocated. Reallocation techniques generate a large load on the system, however, since data is continuously read and written. Additionally, during a disk defragmentation operation, a file system's ability to access the disk to service regular functions is hindered. Therefore, disk defragmentation operations are often performed during system maintenance downtime.

SUMMARY

Embodiments of the present invention include a method for storing data in a first file system format and a replica of the data in a second file system format, wherein the second file system format enables faster reads of the replica than the first file system format enables reads of the data. The method further includes asynchronously updating the replica following changes to the data stored in the first file system format.

The invention further includes a system and apparatus that can perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
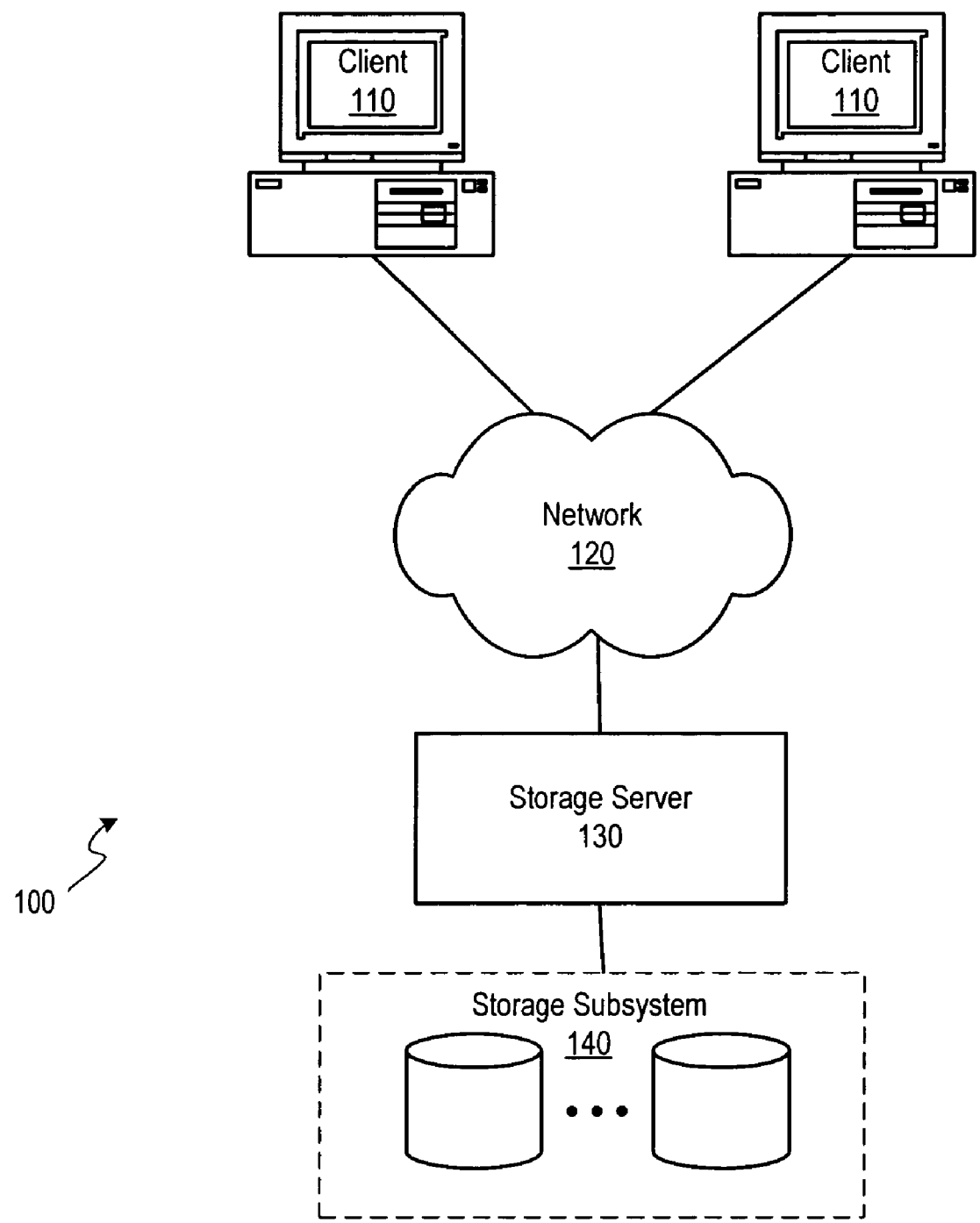
FIG. 1 shows a network environment that includes a storage server which implements the invention.

A file system having a hybrid file system format is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

The file system of the present invention maintains certain data in two formats, thereby defining a hybrid file system format. In one exemplary application, the first format has properties favorable to write operations, e.g. writing to consecutive blocks and protection against problems caused by power failure during writes. For example, the first format may be a log-structured file system format. The second format has properties favorable to read operations, e.g. low fragmentation. For example, the second format may be an extent-based file system format. By storing data according to this hybrid file system format, the file fragmentation problem common to file systems having properties favorable to write operations (e.g. write anywhere file systems) are alleviated while neither sacrificing the advantages of those file systems (e.g. fast writes and point in time images) nor causing a large load on the system. In certain embodiments, the hybrid file system format may be additionally or alternatively defined by file system formats, such as an X Font Server (XFS) format, a Journaled File System (JFS) format, a ZFS format, a File Allocation Table (FAT) format, or New Technology File System (NTFS) format.

As used here, a log-structured file system format is a file system format based on treating a disk as a circular log and writing sequentially to the head of the log to maximize write throughput. This has the side effect of creating multiple, chronologically-advancing versions of both file data and meta-data and generally providing good write performance. A file system maintaining data in such a format can provide access to old versions of files, such as read-only, persistent, point-in-time images (PPIs) of data (e.g. Snapshots® generated by SnapDrive® made by Network Appliances, Inc. of Sunnyvale, Calif.) or other point in time images. Such a file system also recovers quickly after crashes because no consistency checks are needed. An example of a log-structured file system format in accordance with one exemplary embodiment of this invention is a Write Out-of-Place file system format, in which, whenever a data block is modified, it is written to a new physical location on disk.

An extent-based file system format is a file system format based on writing to and reading from extents. An extent is a contiguous area of storage reserved for a file. When starting to write to a file, a whole extent is allocated. When writing to the file again, possibly after performing other write operations, the data continues where the previous write left off. Writing files in this manner tends to reduce or eliminate file fragmentation. Therefore, a file system maintaining data in an extent-based file system format tends to have good read performance. An example of an extent-based file system format in accordance with one embodiment of this invention is a Write-in-Place (WIP) file system format in which, when a data block is modified, the data block is written in its modified form back to the same physical location on the disk on which it was previously stored.

As used herein, the term fragmentation refers to external fragmentation and data fragmentation. External fragmentation is the phenomenon wherein free storage space (i.e. storage space still available for use) becomes divided into many small pieces. External fragmentation also occurs in file systems as many files of different sizes are created, change size, and are deleted. The result is that, although plenty of free space exists, the file system may not be able to use some or all of the existing free space, or at least use it as efficiently as desirable. The effect is even worse if a file that is divided into many small pieces is deleted because the deletion leaves similarly small regions of free space. Convention systems attempt to eliminate external fragmentation through a process called compaction, where existing objects are moved into one large adjacent block, leaving all the remaining free space in one large block. Tools which defragment disk drives typically perform a compaction step.

Data fragmentation occurs when a piece of data in memory is broken up into many pieces which are not close together. It is typically the result of attempting to insert a large object into storage which has already suffered external fragmentation. For example, files in a file system are often broken up into pieces called blocks. When a disk is new, there is space to store the blocks of a file all together in one place. This allows for rapid sequential file reads and writes. However, as files are added, removed, and changed in size, the disk becomes externally fragmented, leaving only small holes in which to place new data. When a new file is written, its data blocks must be scattered out across the disk, slowing access due to seek time and rotational delay of the read/write head. Conventional systems attempt to eliminate data fragmentation by rearranging pieces of data so that related pieces are close together. For example, the primary job of a defragmentation tool is to rearrange blocks on disk so that the blocks of each file are contiguous and in order.

As suggested above, a log structured file system tends to make fragmentation problems worse in comparison to an extent based file system since random writes on the same file in a log structured file system cause both external fragmentation and data fragmentation.

The file system of the present invention can maintain data in two formats, e.g. the log-structured file system format and the extent-based file system format, thereby improving overall system performance. For example, the file system of the present invention can store data such as database files, inode files, subsets of files, or logical unit numbers (LUNs) in a log-structured file system format and a replica of the data in an extent-based file system format.

A replica is generally a copy of the data. An asynchronous replica is a close-in-time but not necessarily entirely up-to-date copy of the data, e.g. the data stored in the log-structured file system format. For example, the asynchronous replica may be an hour, day, or week old copy. A lazy replica is one implementation of an asynchronous replica where the replica is updated with changes whenever it is convenient for a replication agent to do so. In one configuration, for example, a replication agent in a storage server may decide based on information about the memory (e.g. total memory size or percentage of unused memory) to update the lazy replica when the blocks required for updating the lazy replica are about to be discarded from the memory.

The data stored in the log-structured file system format is used for file system operations that benefit from the properties of a log-structured file format, e.g. write operations and retrieval of point-in-time images. The replica of the data stored in an extent-based file system format is used for read operations (e.g. database read operations). When the data in the log-structured format is modified, the replica is updated in a lazy fashion.

When data (e.g. the replica) is updated in a lazy fashion, the data is not updated upon receipt by a file system of a write command, but rather later, in response to occurrence of a certain system condition that occurs after receipt of the write command, e.g. idling of the disk storing the replica or imminent clearing of volatile memory that stores information necessary to perform the update (e.g. due to memory pressure, i.e. running low on memory). The system condition is independent of operations (e.g. read or write operations) on the data stored in the log-structured file system format. In other words, the update operation is asynchronous from the write operation(s) which stores data in a first file system format (e.g. the log-structured file system format). Accordingly, the data stored in the log-structured file system format may be modified several times before the lazy replica of the data stored in the extent-based file system format is updated.

Additionally, a lazy update may not commit all the data indicated in a data structure (e.g. a bitmap or other metadata file) to the second file system format (e.g. the extent-based file system format). Rather, a lazy update may commit only some of the data indicated in the data structure. For example, in one exemplary configuration, a lazy update commits only the data that a bitmap indicates is to be stored in currently idling disks. The lazy update waits to update other data indicated in the bitmap if the other data is to be stored in disks currently being written to by a log-structured file system 312, for example.

By maintaining data in two formats, one optimized for write operations and one optimized for read operations, and updating the data stored in the format optimized for read operations in a lazy fashion, the system improves overall read and write performances while still providing the features unique to each file system format, e.g. point-in-time images.

In certain applications, to further improve read operations, the replicas of data stored in the extent-based file system format are allocated over a fixed disk block number (DBN) range which is not equal to the full DBN range of a disk. By limiting the DBN range, random read input/output operations per second (IOPS) increases. In one exemplary application, the fixed DBN range is located in the outer tracks of a disk which rotate at a velocity proportional to the track's distance from center of the disk, thereby providing further improvement in IOPS. In other configurations, the fixed DBN range may be located in the inner tracks of a disk, middle tracks of a disk, or peripheral tracks of a disk.

FIG. 1 shows a network environment that includes a storage server which implements the invention. In FIG. 1, the network environment 100 includes clients 110, a network 120, a storage server 130, and a storage subsystem 140. Each of the clients 110 is connected to the network 120. Network 120 is connected to the file server 130. The storage server 130 is connected to the storage subsystem 140.

Each of the clients 110 may be, for example, a conventional personal computer (PC), workstation, or the like. The network 120 may be, for example, a local area network (LAN), a wide area network (WAN), a metropolitan area network (MAN), or a global area network (GAN) such as the Internet. The storage server 130 may be, for example, a file server, a block-level server, or a combination thereof.

The storage subsystem 140 includes an array of mass storage devices. The mass storage devices in the storage subsystem 140 may be, for example, conventional magnetic disks, optical disks such as CD-ROM or DVD based storage, magneto-optical (MO) storage, or any other type of non-volatile storage devices suitable for storing large quantities of data. In certain applications, the storage devices are disks attached directly to a computer bus, e.g. an array of Redundant Array of Inexpensive Disk (RAID) disks, or disks accessible through a network, e.g. storage area network (SAN) disks.

In operation, the storage server 130 receives and responds to read and write requests from the clients 110, directed to data stored in or to be stored in the storage subsystem 140. The clients 110 typically communicate with the storage server 130 by exchanging discrete frames or packets of data formatted according to predefined network communication protocols, such as the Transmission Control Protocol/Internet Protocol (TCP/IP). In this context, a protocol consists of a set of rules defining how the interconnected computer systems interact with one another.

The storage server 130 may have a distributed architecture; for example, it may include a separate N-("network") blade and D-(disk) blade (not shown). In such an embodiment, the N-blade is used to communicate with clients 110, while the D-blade includes the file system functionality and is used to communicate with the storage subsystem 140. The N-blade and D-blade communicate with each other using an internal protocol. Alternatively, the storage server 130 may have an integrated architecture, where the network and data components are all contained in a single box. The storage server 130 further may be coupled through a switching fabric to other similar storage servers (not shown) which have their own local storage subsystems. In this way, all of the storage subsystems can form a single storage pool, to which any client of any of the storage servers has access.

Figure 2:
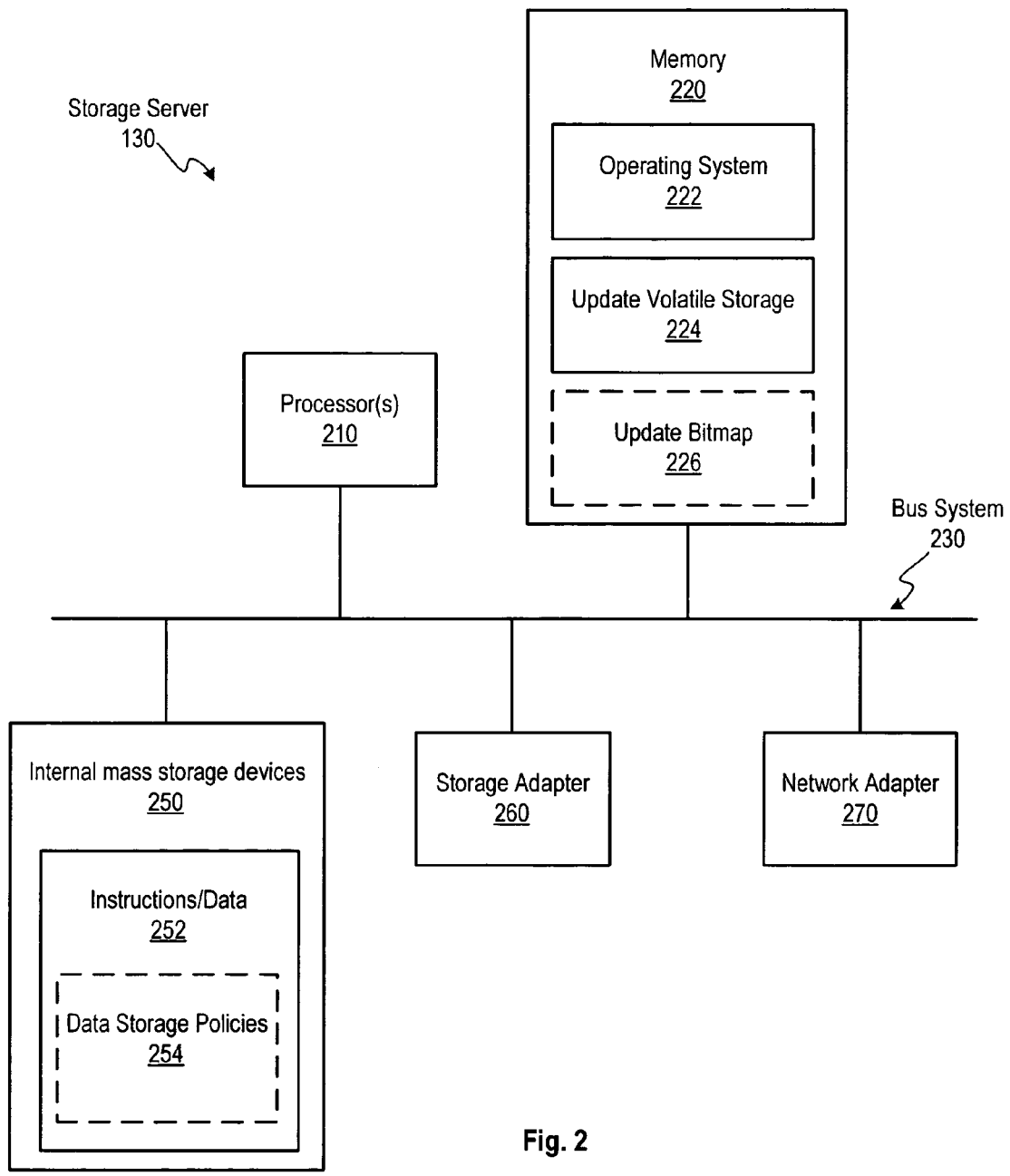
FIG. 2 is a block diagram showing the architecture of the storage server of FIG. 1.

FIG. 2 is a block diagram showing the architecture of the storage server 130, according to certain embodiments of the invention. Certain standard and well-known components which are not germane to the present invention may not be shown. In FIG. 2, the storage server 130 includes one or more processor(s) 210, memory 220, a bus system 230, one or more internal mass storage devices 250, a storage adapter 260, and a network adapter 270. The processor(s) 210, the memory 220, the internal mass storage devices 250, the storage adapter 260, and the network adapter 270 are connected to each other through the bus system 230.

The processor(s) 210 are the central processing units (CPUs) of the storage server 130 and, thus, control the overall operation of the storage server 130. In certain embodiments, the processor(s) 210 accomplish this by executing software stored in the memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the storage server 130. The memory 220 represents any form of random access memory (RAM), read-only memory (ROM), flash memory, or the like, or a combination of such devices. The memory 220 stores, among other things, the operating system 222 of the storage server 130, in which the file system having the hybrid file system format introduced above can be implemented. The memory 220 also includes the update volatile storage 224 and, optionally, an update bitmap 226.

The bus system 230 shown in FIG. 2 is an abstraction that represents any one or more separate physical buses and/or point-to-point connections, connected by appropriate bridges, adapters and/or controllers. The bus system 230, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The internal mass storage devices 250 may be or include any conventional medium for storing large volumes of data in a non-volatile manner, such as one or more magnetic or optical based disks. The internal mass storage devices 250 include instructions/data 252, which includes the data storage policies 254.

The storage adapter 260 allows the storage server 130 to access the storage subsystem 140 and to communicate with the array of storage devices in the storage subsystem 140. The storage adapter 260 may be, for example, a Fibre Channel adapter or a SCSI adapter.

The network adapter 270 provides the storage server 130 with the ability to communicate with remote devices, such as the client(s) 110, over the network 120 and may be, for example, an Ethernet adapter, or a FibreChannel adapter.

In operation, the processor(s) 240 executes instructions stored in the memory 220. These instructions cause the storage server 130 to perform a set of operations, including, for example, storing data in a first file system format, storing a replica of the data in a second file system format, and asynchronously updating the replica following changes to the data stored in the first file system.

Figure 3:
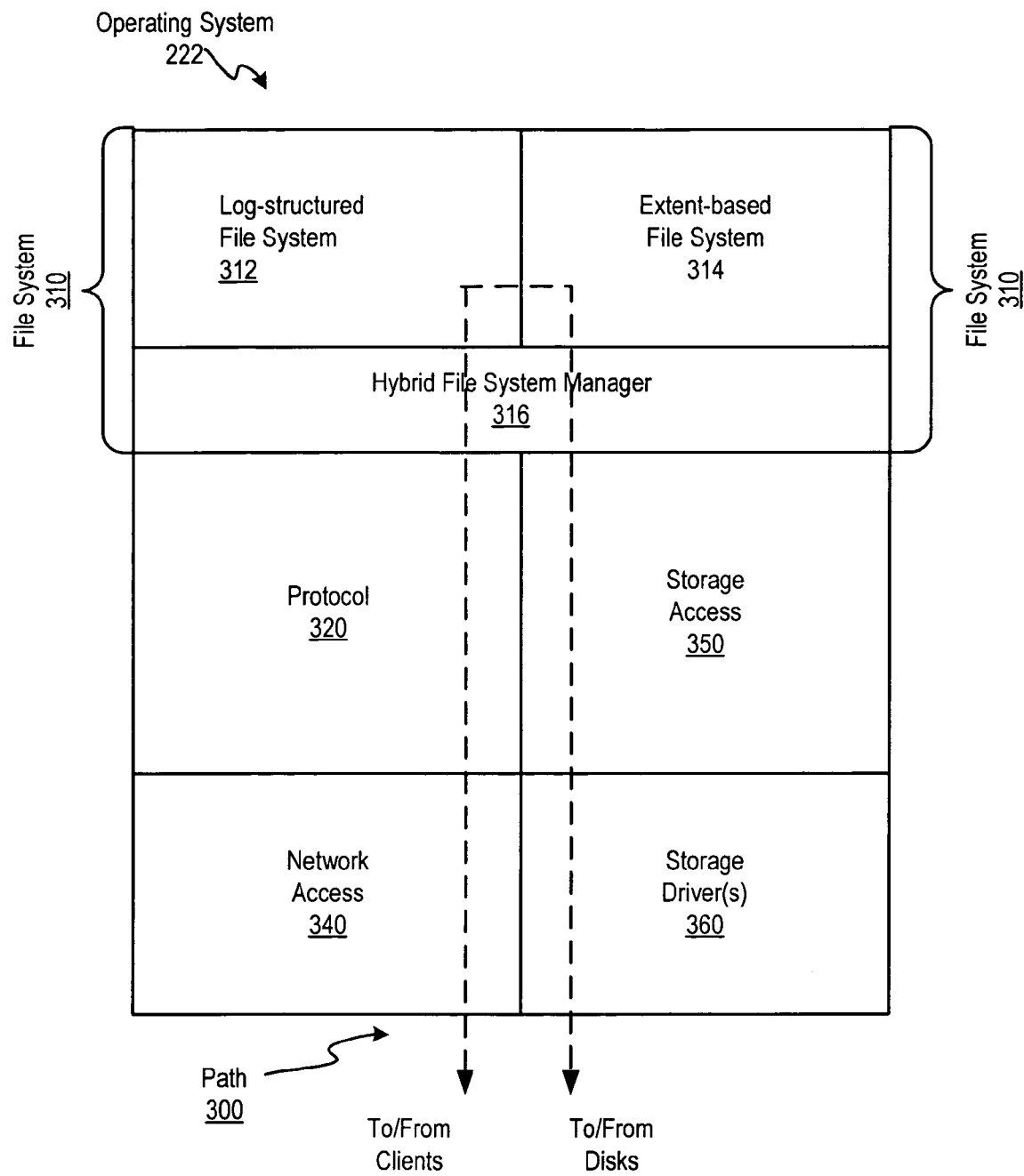
FIG. 3 is a block diagram showing the operating system of the storage server of FIG. 2.

FIG. 3 shows an example of the operating system 222 of the storage server 130. As shown, the operating system 222 (e.g. a version or modification of the Data ONTAP® operating system made by Network Appliance, Inc.) includes several modules, or "layers". These layers include a file system 310, a protocol layer 320, an associated network access layer 340, a storage access layer 350, and an associated storage driver layer 360. Also shown in FIG. 3 is a path 300 of data flow, through the operating system 222, associated with a read or write operation.

A file system 310 is a layer between an application and secondary storage (e.g. disk drives). The file system 310 provides services to organize and provide access to data stored in secondary storage. For example, the file system 310 keeps track of the directory structure (hierarchy) of the data stored in the storage subsystem 140 and manages read/write operations on the data (e.g., executes read/write operations on the disks in response to client requests). The file system 310 presents the secondary storage as a collection of persistent objects called files.

In FIG. 3, the file system 310 includes a log-structured file system 312, an extent-based file system 314, and a hybrid file system manager 316. The log-structured file system 312 allows the file system 310 to store data in a log-structured file system format, e.g. a presently released WAFL® file system format by Network Appliance, Inc. The presently released WAFL® file system design is a variation of a log-structured file system. As used herein, the term "log structured file system" includes both standard log-structured file systems as well as variations thereof, including the presently released WAFL®.

The extent-based file system 314 allows the file system 310 to store data in an extent-based file system format. The hybrid file system manager 316 communicates with the extent-based file system 314 to direct the extent-based file system 314 to store replicas of the data stored in the log-structured file format in the extent-based file format. The hybrid file system manager 316 also manages updating of the replicas stored in the extent-based file format.

The protocol layer 320 and an associated network access layer 340 are logically "under" the file system 310 to allow the storage server 130 to communicate over the network 120 (e.g. with clients 110). The protocol layer 320 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 340 includes one or more drivers which implement one or more lower-level protocols to communicate over the network, such as Ethernet or Fibre Channel.

The storage access layer 350 and an associated storage driver layer 360 are also logically under the file system 310 to allow the storage server 130 to communicate with the storage subsystem 140. The storage access layer 350 can implement a higher-level disk storage protocol, such as RAID when the data is to be protected, while the storage driver layer 360 implements a lower-level storage device access protocol, such as Fibre Channel Protocol (FCP) or SCSI.

In one operation, when a client transmits file to be written to disk, the file is transmitted through the network access layer 340 and protocol layer 320 to the file system 310. The file system 310 writes the file to disk in a log-structured file system format using the log-structured file system 312 (e.g. the presently released WAFL® file system). The hybrid file system manager 316 determines if a replica of the file should also be stored in an extent-based file system format, e.g. based on a user-defined file storage policy, a type of file, whether the file is a database index file, or whether the file is an inode file.

If a replica of the file should also be stored in an extent-based file system format, the hybrid file system manager 316 directs the extent-based file system 314 to store the replica in an extent-based file system format in a lazy fashion. Accordingly, the extent-based file system 314 does not necessarily store the asynchronous replica when the log-structured file system 312 stores the data, but rather in response to a certain system condition, e.g. the earlier of when a particular mass storage device (which stores or will store the replica) enters an idle state or when a volatile memory currently storing the data, that will be stored in the extent-based file system format, is about to be cleared.

Accordingly, storing the data in a log-structured file system format and a replica of the data in an extent-based file system format can be viewed as stages in a pipeline, wherein incoming writes are first committed to disks in the log-structured file system format (e.g. the presently released WAFL® format) and then staged to be committed to disks in the extent-based file system format in a lazy fashion.

In one illustrative configuration, the file system 310 is configured to stage writes for commitment to disks in the extent-based file system format only when the write is associated with certain files or LUNs. As used herein, a logical unit number (LUN) is a logical data container. For example, a LUN may be a file that is accessible to clients through Fibre-Channel, small computer system interface (SCSI) or other block oriented access protocols. As used herein, a block is a logical unit of data stored on a storage device. Files, and other data, stored on the mass storage devices are typically stored in the form of one or more blocks. A file may include pointers referencing one or more blocks that store the data comprising the file. A block oriented access protocol is directed towards providing block-level access (as compared to file-level access).

In one application, files/LUNs can be created with a special option, which if exercised, causes the file system 310 to store a file/LUN in the extent-based file system format. Then, when a client modifies the file/LUN, the log-structured file system 312 writes the modifications to the log-structured file system format file. The hybrid file system manager 316 stores an indication (e.g. a bit in a bitmap) indicating that the replica stored in the extent-based file system format should be updated. The corresponding data blocks of the replica may be marked as invalid. The replica is then updated in a lazy fashion in order to propagate the modifications to the file/LUN through the storage server. After a data block of the replica is updated, the data block may then be marked as valid (e.g. the invalid marking may be removed).

In certain applications, the file/LUN and its corresponding replica are stored in the same set of storage devices. For example, in one application, a set of storage devices has a first set of DBN addresses which are RAID-4 protected and a second set of DBN address which are not (e.g. RAID-0). The file/LUN is stored in the first set while the replica is stored in the second set.

Figure 7:
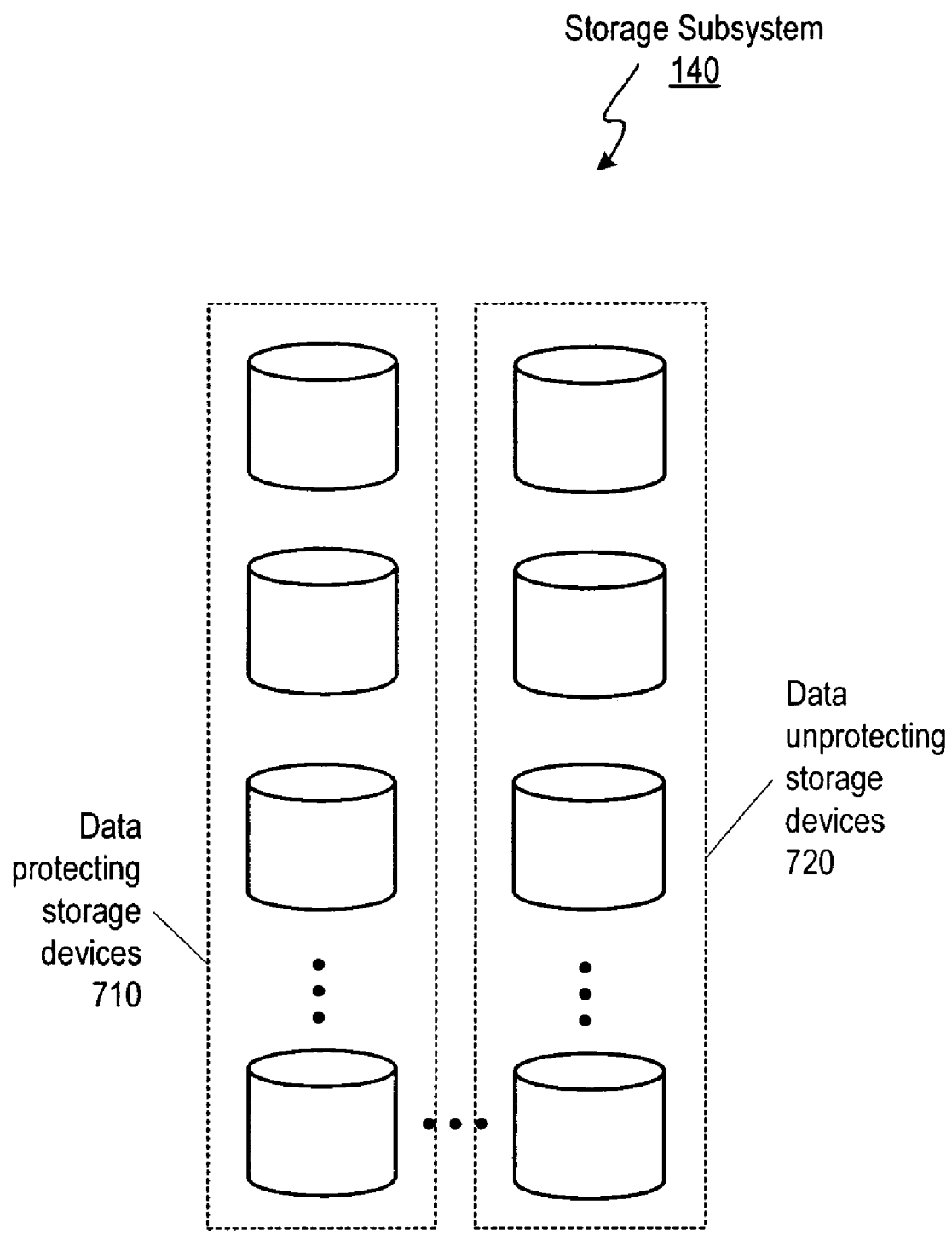
FIG. 7 is a block diagram of two sets of storage devices, one to store data in a first file system format and the other to store a replica of the data is a second file system format.

In another application, the file system 310 writes the log-structured file system format file in a first set of storage devices and the replica in the extent-based file system format in a second set of storage devices. For example, the file system 310 may write the log-structured file system format file in data protecting storage devices 710 shown in FIG. 7 and the extent-based file system format in data unprotecting storage devices 720.

The data protecting storage devices 710 stores the data in the first file system format with protection against data corruption, device failure, or a combination thereof, independent of the data in the second file system format. For example, the storage devices 710 may protect the stored data using parity, compression, mirroring, or a combination thereof. In one exemplary embodiment, the storage devices 710 is a Redundant Array of Inexpensive Disks (RAID) array of disks, e.g. RAID-4 which protects stored data using a dedicated parity disk.

The data unprotecting storage devices 720 stores the replica in the second file system format without protecting the replica in the second file system format against data corruption, device failure, or a combination thereof, independent of the data in the first file system format. For example, the storage devices 720 does not mirror the stored replicas, use parity, either in a dedicated disk or striped across an array, or use a compressed version of the replicas to protect the stored replicas. By not protecting the data in the extent-based file system format, which are lazy replicas of data already stored in a log-structured file system format, more storage space is available to store lazy replicas in the extent-based file system format.

Additionally, by not protecting the storage devices 720 with parity, writes to the storage devices 720 to update the replicas are faster. Random writes involve a heavy penalty in parity protected systems. They incur extra reads in order to recompute the parity and write to the parity drive. This penalty may be severe in a RAID-4 system where a single drive serves as the parity drive and must be updated for every write operation. Hence it quickly becomes a bottleneck. By not using parity to protect storage devices 720, these extra read and write operations are eliminated and parity disk bottlenecks may be avoided, thereby reducing the time taken to update the replicas.

However, by not protecting drives in the storage devices 720, when a drive in the storage devices 720 fails, data in the drive cannot be reconstructed. When such a situation occurs, a read operation may be completed using the storage devices 710 until the data in the drive is reconstructed using the data stored in the storage devices 710. Block checksums can be maintained to help detect block level corruption in drives in the storage devices 720. When a checksum indicates that corruption exists, read operations may be again be completed using the storage devices 710 until the data block in the corrupted drive is reconstructed using the data stored in the storage devices 710.

Figure 4:
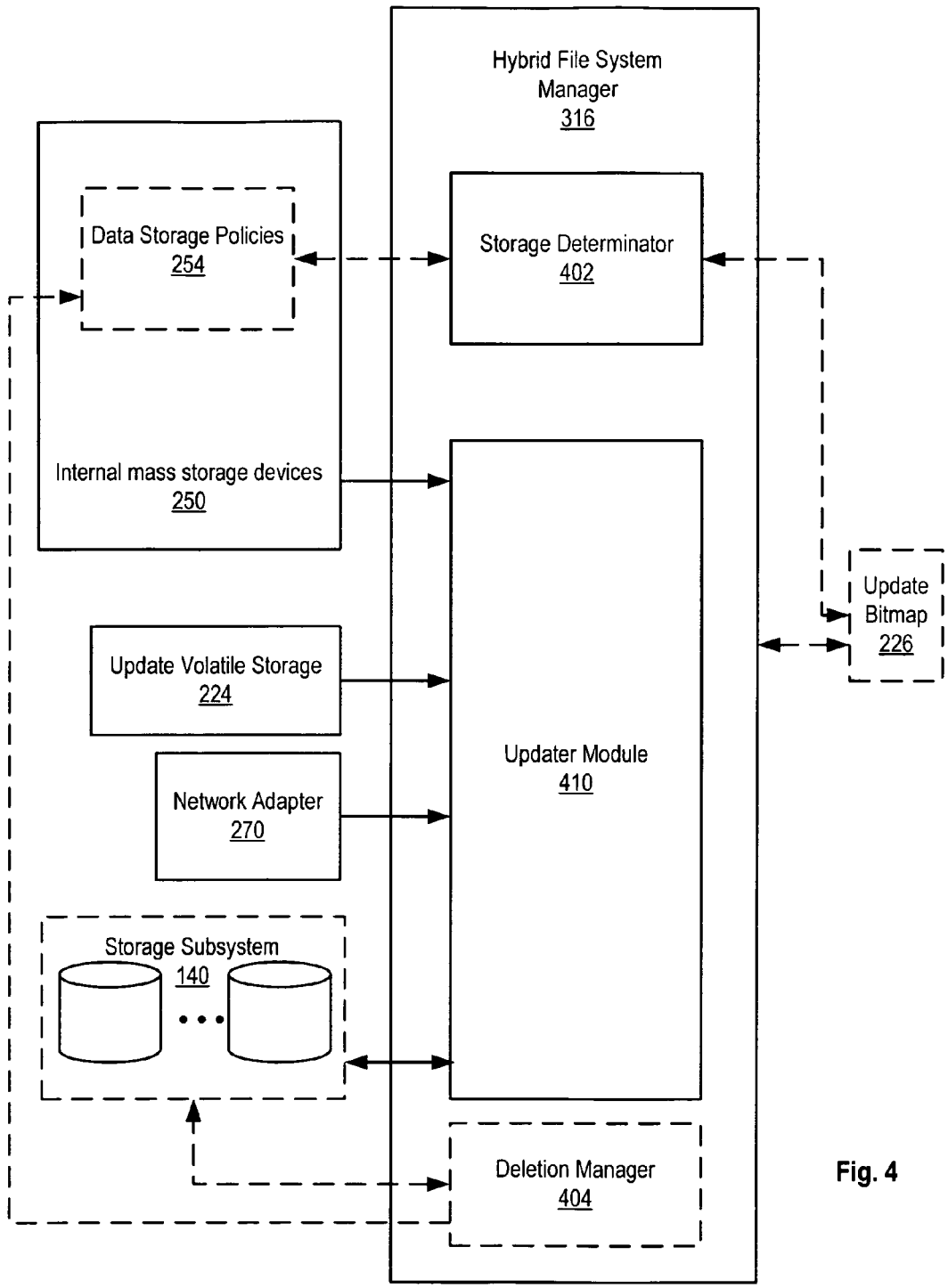
FIG. 4 is a block diagram showing interactions between components of the extent-based file system storage manager of FIG. 3 and various systems and devices of FIGS. 1-3.

FIG. 4 is a block diagram illustrating communications between the hybrid file system manager 316 and various systems and devices. In FIG. 4, the hybrid file system manager 316 includes a storage determinator 402, an updater module 410, and an optional deletion manager 404. In FIG. 4, the storage determinator 402 communicates with the data storage policies 254 in the internal mass storage devices 250 as well as the update bitmap 226. The updater module 410 communicates with the update bitmap 226, the internal mass storage devices 250, the update volatile storage 224, the network adapter 270, and the storage subsystem 140. The deletion manager 404 communicates with the storage subsystem 140.

In one operation, when the file system 310 receives a data (e.g. a file, a subset of a file, or a LUN) to be written to disk, the hybrid file system manager 316 uses the storage determinator 402 to determine if a replica of the data should be stored in an extent-based file system format.

In one application, the storage determinator 402 determines that the replica should be stored in an extent-based file system format when the data has a threshold potential fragmentation. A threshold potential fragmentation is value indicating a predicted fragmentation. A threshold potential fragmentation may be a number or a percentage, for example, derived from analyzing factors such as data indicating typical fragmentation of certain types of files. Above the threshold, data received for storage to disk will be stored in a second format, e.g. the extent-based file system format.

Determining that the data has a threshold potential fragmentation may include analyzing a user-defined data storage policy, e.g. accessing the data storage policies 254 and determining whether any relevant policy indicates that the type of the data or a source of the data maps to a potential fragmentation at or above the threshold. For example, when a file is created, the file system 310 assigns each file a sequence of consecutively numbered file block number (FBNs). The file system 310 allots space for the file (or LUN) in a log-structured file system volume block number (VBN) space and associates (e.g. in a bitmap) the assigned FBNs with the allotted VBNs. An administrator may indicate in a data storage policy that the file (or LUN) should also be stored in the extent-based file system format. If so, then space in the extent-based file system VBN space is allotted for the file/LUN. A mapping from the FBN space to the extent-based file system VBN space (which may be the same mapping that associates FBNs to the VBNs in the log-structured VBN space) can be established which can be efficiently stored and translated on the fly when the file system 310 receives a read request. For example, in one configuration, a mapping from the FBN space to both the log-structured file system VBN space and the extent-based file system VBN space is stored in a memory designed for fast access by the file system 310 (e.g. a memory of a particular type, a memory in a particular location relative to the processor, etc). When a read request for the file is received, the file system 310 uses the mapping to determine which VBNs (and which VBN space) to access to fulfill the request.

Determining that the data has a threshold potential fragmentation may alternatively or additionally include determining whether the data comprises a certain type of data. For example, when the data is database data rather than, for example, a digital photograph, the data tends to be modified multiple times during its lifetime, indicating that it has a tendency to become fragmented. Database data also tends to be read fairly frequently. Therefore, a replica of the data may be stored in an extent-based file format (automatically or based on data storage policy) to optimize read operations.

Determining that the data has a threshold potential fragmentation may alternatively or additionally also include specifically determining whether the data is a database index file. Database index files also tend to be long-lived and modified during their lifetime. Therefore, they have a high potential for fragmentation. They also tend to be read frequently. Therefore, a replica of the database index file may be stored in an extent-based file format (automatically or based on data storage file) to optimize read operations on the index file.

Determining that the data has a threshold potential fragmentation may further alternatively or additionally include specifically determining by a hybrid file system manager (described in more detail below) whether the data is an inode file. An inode file is a file which contains the inodes of all files in a particular volume. An inode is a metadata structure which is used to store metadata about a file, such as ownership of the file, access permission for the file, size of the file, file type, and pointers used to locate the data blocks for the file. Therefore, to optimize read operations on the inode file, a replica of the inode file may be stored in an extent-based file format (automatically or based on data storage file).

In one exemplary application, when the storage determinator 402 determines that a replica of the data should be stored in an extent-based file system format, the storage determinator 402 writes a bit to the update bitmap 226 indicating that the data, currently stored in volatile memory (e.g. in the update volatile storage 224) should be written to nonvolatile storage in an extent-based file system format.

When a certain system condition exists, the updater module 410 accesses the update bitmap 226 and the volatile memory (e.g. the update volatile storage 224), and writes the data to the disk (e.g. in storage subsystem 140) in an extent-based file system format. In certain configurations, the system condition is an idling of a disk where the extent-based file system format data is to be stored, an imminent clearing of a volatile memory storing the data (e.g. the update volatile storage 224), and/or reaching a threshold number of operations waiting to write data in the extent-based file system format. An idling of a disk occurs when the disk is not being accessed (e.g. by a processor 210 attempting to read data from or write data to the disk). An imminent clearing of a volatile memory is a clearing of data stored on the volatile memory that is expected to occur within a short time period, e.g. milliseconds, seconds, or minutes. Reaching a threshold number of operations waiting to write data in the extent-based file system format is being in a state in which a count of a number of write operations, which will write data in the extent-based file system format, is beyond a value (e.g. a value defined by a user policy or based on a total memory size of the update volatile storage 224). Above that value, the hybrid file system will begin processing one or more of the write operations that were counted such that corresponding data is be written to a disk in the extent-based file system format.

In another operation, when the file system 310 wants to change data (e.g. the file, a subset of the file, or the LUN) already written to disk, the hybrid file system manager 316 uses the storage determinator 402 to determine if a replica of the data was previously stored in an extent-based file system format. If yes, the storage determinator 402 writes a bit to the update bitmap 226 indicating that the updated data, currently stored in volatile memory (e.g. in the update volatile storage 224), should be written to nonvolatile storage in the extent-based file system format.

In response to a certain system condition, the updater module 410 accesses the update bitmap 226 and the volatile memory (e.g. the update volatile storage 224), and writes the updated data to the disk according to the extent-based file system format. The system condition may be for example idling of a disk where the previous extent-based file system format data was stored, imminent clearing of the volatile memory storing the updated data (e.g. the update volatile storage 224), and/or reaching a threshold number of operations waiting to write data, including the updated data, in the extent-based file system format.

The system condition may also include receiving a request to read the non-updated portion of the replica. For example, in one application, the storage server 130 receives a request via the network adapter 270 from a client 110 to read a database index file. Normally, when the file system 310 in the storage server 130 determines that the index file stored in the extent-based file system format (i.e. the lazy replica) is up-to-date (e.g. by accessing the update bitmap 226), the file system 310 reads the lazy replica rather than the log-structured file system format file in order to complete the read operation more quickly. In one configuration, however, when the update bitmap 226 indicates that the lazy replica is waiting to be updated (e.g. because the index file was recently updated), the file system 310 initiates an update of the replica.

Accordingly, using the file system of the present invention, a file's file block number (FBN) can have two possible locations, one dictated by the log-structured file system format and one dictated by the extent-based file system format. The log-structured file system volume block number (VBN) is always up-to-date (or "valid"). The corresponding location in the extent-based file system VBN space, however, may or may not be up-to-date, depending on whether a lazy update has occurred. The update bitmap 226, or another metadata file, indicates whether an extent-based file system VBN corresponding to a FBN is valid. For example, the bitmap 226 can have a bit for each file (e.g. per L0 block point) or FBN which indicates whether a corresponding extent-based file system VBN is valid. For example, a bit of 1 (or 0) may indicate that the corresponding extent-based file system VBN is up-to-date. Accordingly, a bit of 0 (or 1) may indicate that the corresponding extent-based file system VBN is not up-to-date and that a write operation which will update the extent-based file system VBN is pending. If the bit indicates that the corresponding extent-based file system VBN is invalid (i.e. not up-to-date, corrupt, or otherwise should not be read), then the hybrid file system manager may read the file from the log-structured file system VBN space instead of attempting to read from the extent-based file system VBN space. In certain configurations, the hybrid file system manager may, additionally or alternatively, begin processing pending write operations to update data stored in the extent-based file format to make extent-based file system VBNs valid.

In one configuration, the deletion manager 404 determines when replicas stored in the extent-based layout have reached a predetermined age (e.g. months or years) without being accessed. This age may be predetermined and defined by a system administrator in data storage policy 254, for example. When the age is reached by a replica, the deletion manager 404 deletes the replica stored in the stored in the extent-based file system format. The corresponding log-structured file format file remains stored in storage devices 140, however. Using this configuration, space is made available for other files or LUNs while the data previously stored as a replica in the extent-based file system format remains available in the log-structured file system format.

Figure 5A:
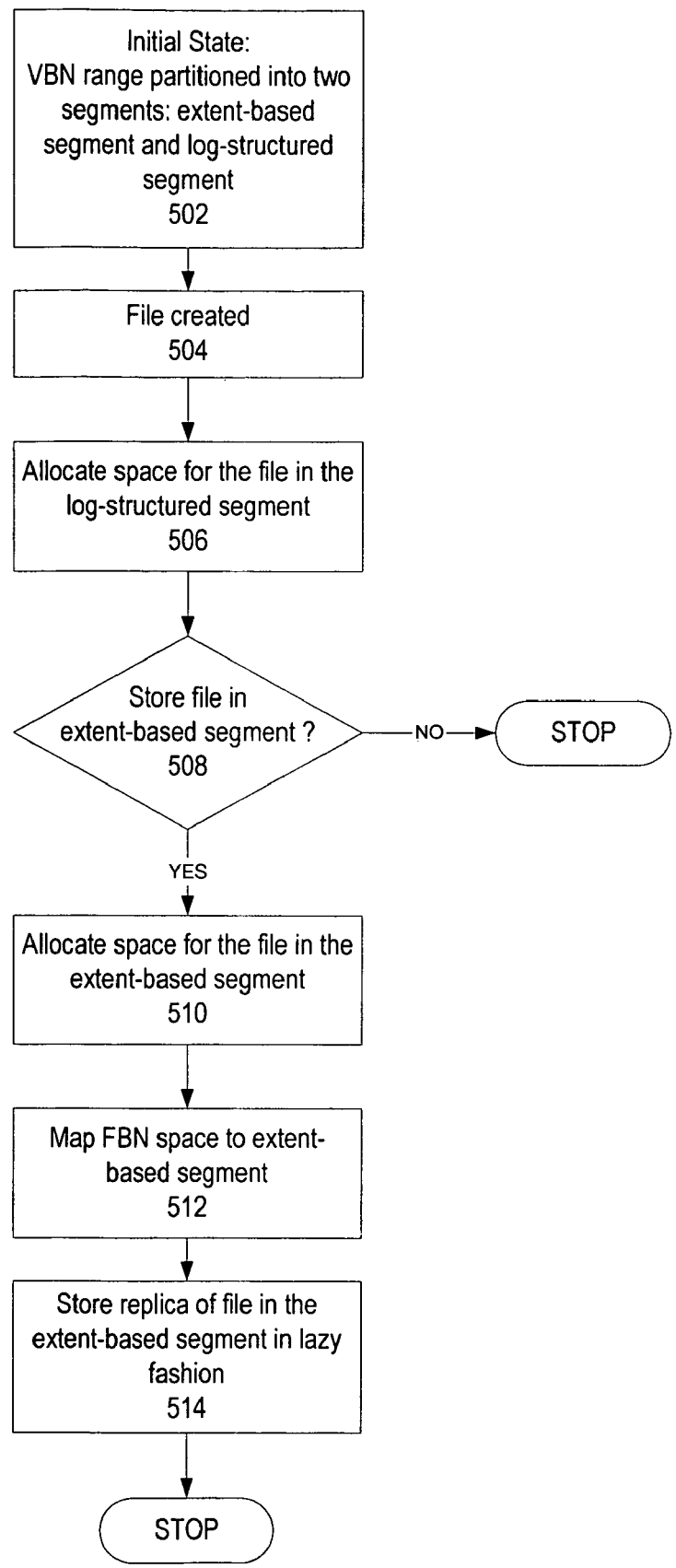
FIGS. 5A-5C are flow diagrams illustrating flows of three illustrative processes implementing the file system of the present invention.
Figure 5B:
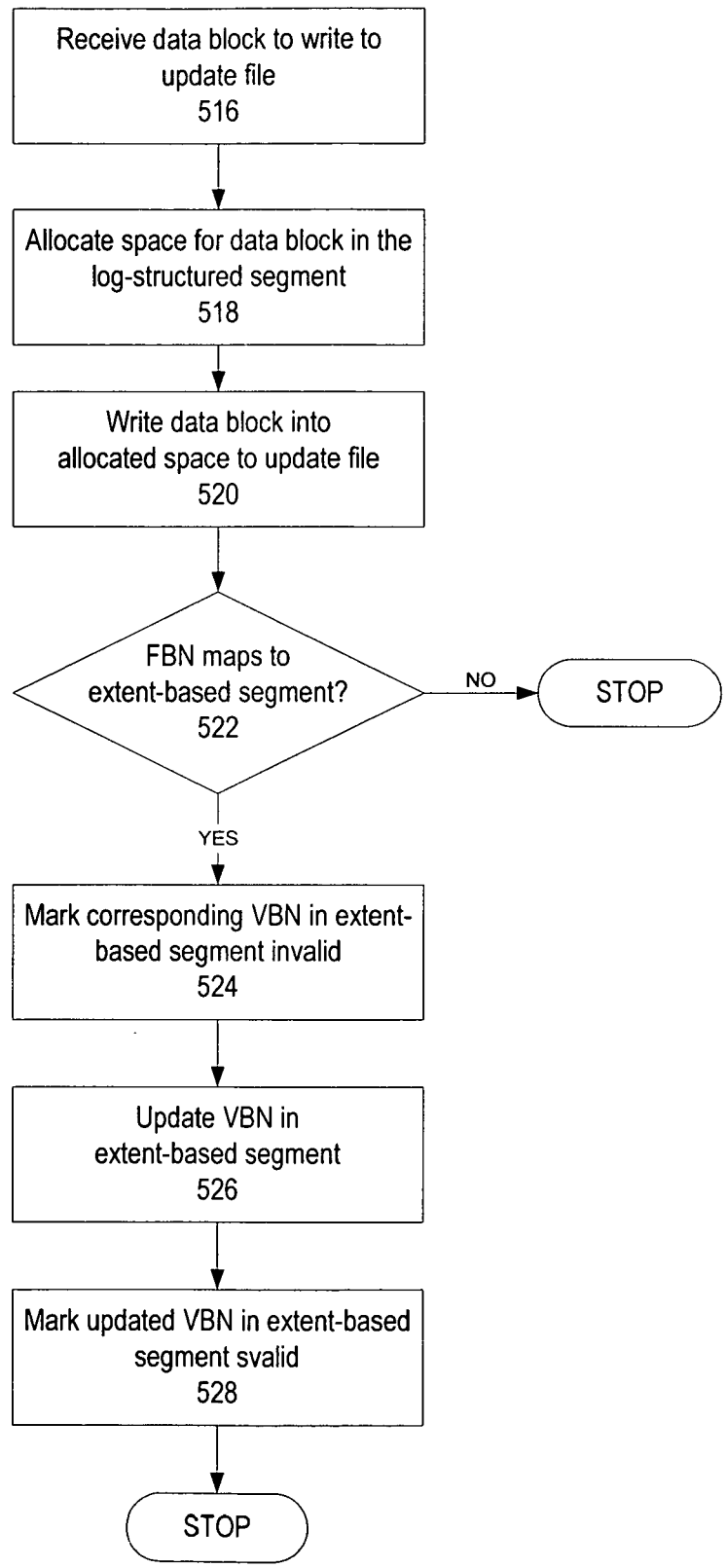
Figure 5C:
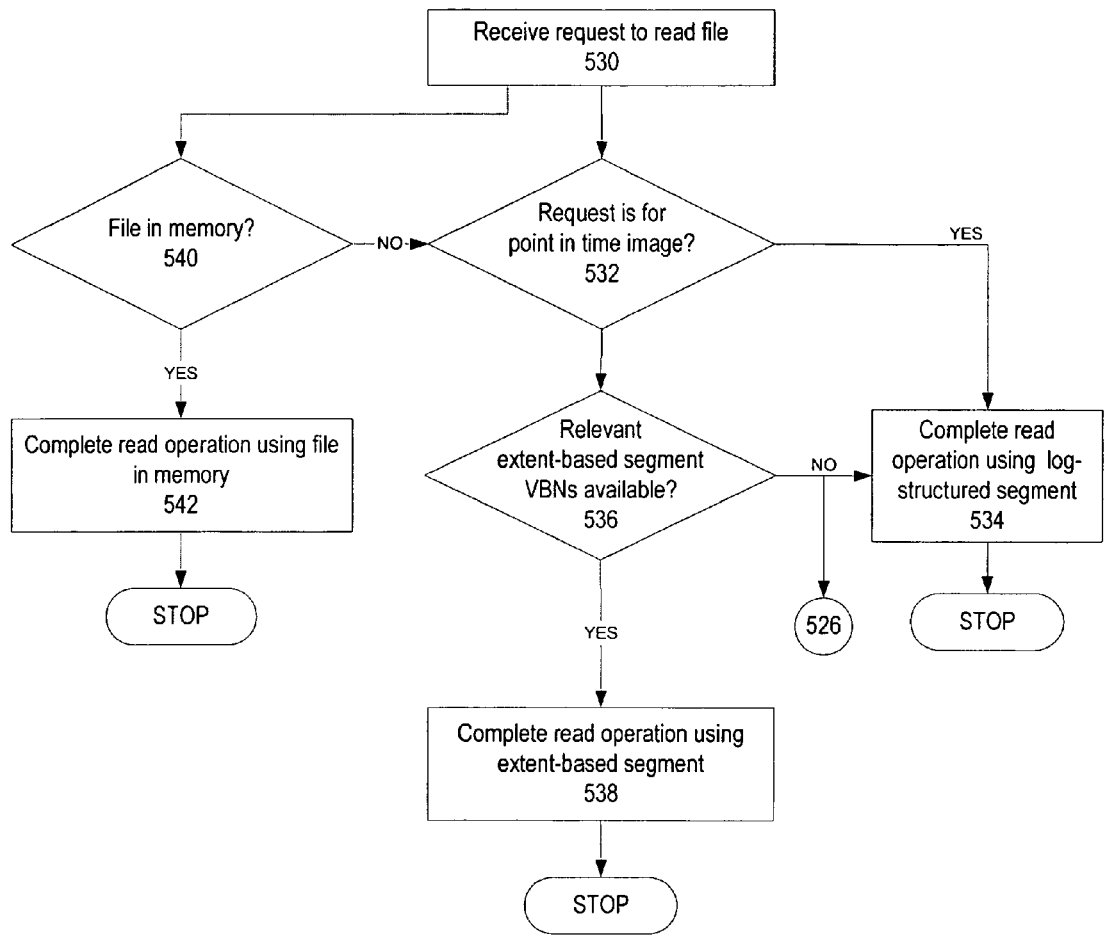

FIGS. 5A-5C are flow diagrams illustrating flows of three exemplary processes implementing the file system of the present invention. FIG. 5A illustrates initial configuration prior to storing files/LUNs and then storing a newly created file. FIG. 5B illustrates a process of updating the stored file. FIG. 5C illustrates a process of reading the stored file.

The process begins at 502, in which an available VBN range is partitioned into two segments. Illustratively, in FIG. 5A, the first segment is used for extent-based file system formatted data (called the extent-based segment for convenience) and the second segment is used for log-structured file system formatted data (called the log-structured segment for convenience).

Figure 6:
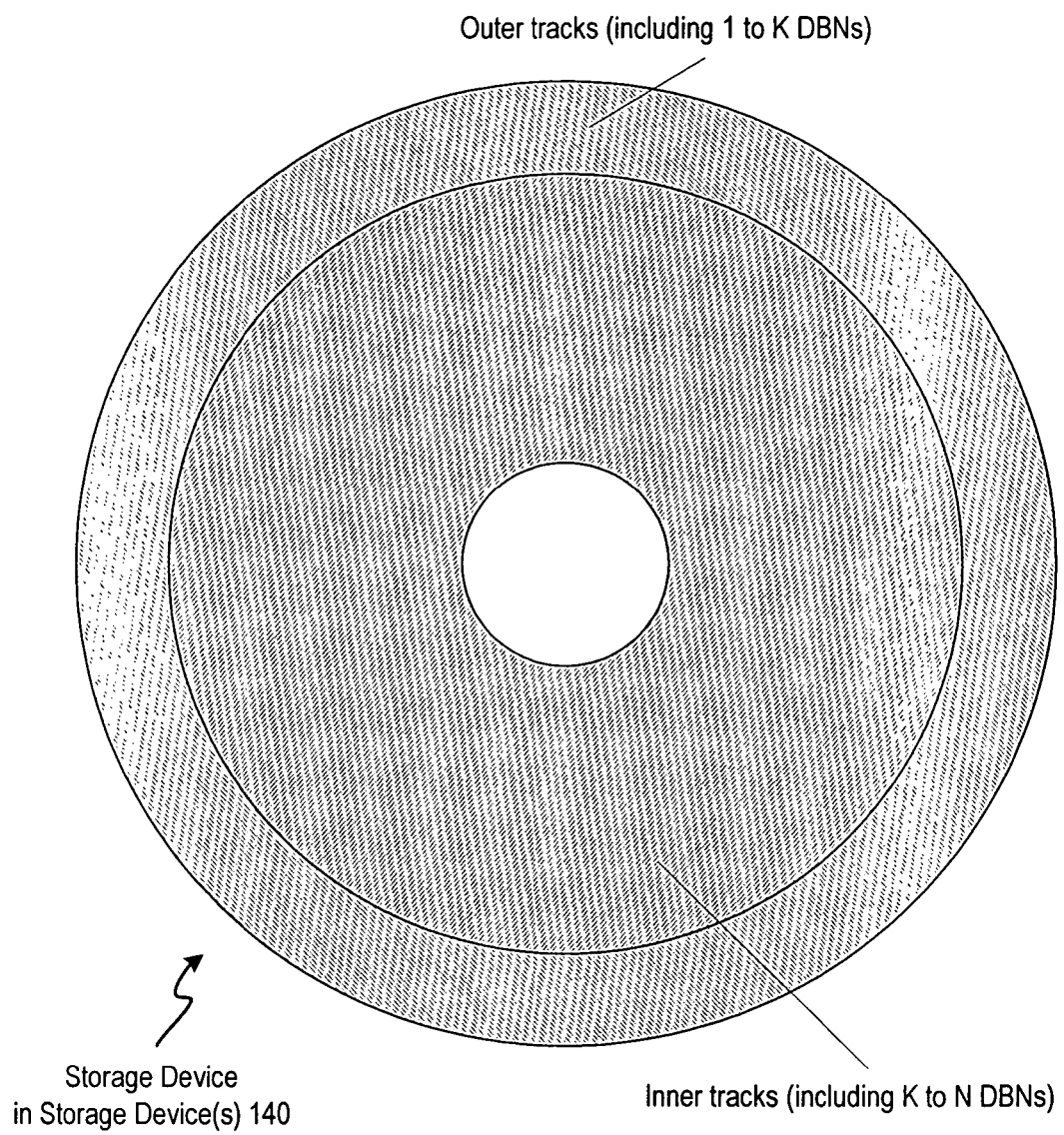
FIG. 6 is a block diagram of one disk which is logically segmented into two segments in accordance with one embodiment of this invention.

FIG. 6 is a block diagram of one disk which is segmented into two segments in accordance with one embodiment of this invention. The first segment includes 1 to K DBNs from each (real, not virtualized) disk in a RAID group, where K is a variable that may be expressed as a number (e.g. in gigabytes) or a fraction or percentage (e.g. 25%) of the overall DBN range. The second segment includes K to N DBNS from each (real, not virtualized) disk in the RAID group, where N is the usable DBN range per disk in the RAID group. Because the outer sectors of the each disk is used for extent-based file system formatted data, sequential reads is faster since the data can be read faster from a disk's outer sectors. In another embodiment, the first segment and second segments are located on different storage devices. In one embodiment, the first segment is not parity protected. In one embodiment, extents in the first segment are also allocated to LUNs in order to overprovision space for LUNs.

Referring back to FIG. 5, at 504, a file is created. At 506, space for the file is allocated (e.g. by the log-structured file system 312) in the log-structured segment (e.g. a WAFL® VBN space). At 508, a decision is made (e.g. by the storage determinator 402) whether to store the file in the extent-based segment. If no, then the process stops. If yes, then at 510, space for the file is allocated in the extent-based segment (e.g. by the extent-based file system 314).

At 512, the FBN space is mapped to the extent-based segment (e.g. by the hybrid file system manager 316). The mapping may include extra meta-data that indicates whether the extent-based segment VBN corresponding to each FBN is valid. In certain applications, this meta-data is stored in a separate meta-file which can be efficiently stored and translated on the fly. At 514, a replica of file is stored in the extent-based segment in a lazy fashion.

In FIG. 5B, at 516, the file system receives a data block to write to storage in order to update the file. At 518, space for the block is allocated (e.g. by the log-structured file system 312) in the log-structured segment (e.g. a WAFL® VBN space). At 520, the data block is written into allocated space in the log-structured segment, e.g. by the log-structured file system 312.

At 522, a determination (e.g. by storage determinator 402) is made determining whether an FBN corresponding to the data block also maps to an extent-based segment. Such a mapping indicates that a replica of the file was stored in an extent-based file system format. If no mapping exists, then the process stops.

If a mapping exists, then at 524, the VBN in the extent-based segment corresponding to the FBN is marked invalid, e.g. using the update bitmap 226. At 526, the corresponding VBN in extent-based segment is updated in a lazy fashion using the data block.

In one embodiment, a scanner process runs in the background maintaining a list of extent-based segment VBNs which need to be synced to their log-structured segment VBN counterparts. The expected input/output operations to sync the VBNs can be collated, sorted, and executed efficiently when a certain system condition exists, e.g. memory pressure or idling of the disk involved in the input/output operations. In other words, because writing data in the second file system format (e.g. the extent-based file system format) is done in a lazy fashion, the write operations may performed as a batch job.

At 528, after the VBN is updated, the VBN is marked valid, e.g. using the update bitmap 226.

In FIG. 5C, at 530, the log-structured file system 312 receives a request to read the file stored in FIG. 5A (or updated in FIG. 5B). At 532, the file system 312 determines if the request is for a point in time image, e.g. a Snapshot™. If the request is for a point-in-time image, then at 534, the read operation is directed to the log-structured segment (e.g. a write out-of-place VBN space). This is because snapshots are available for files stored in a log-structured file system format (e.g. write out-of-place) but not for files stored in an extent-based file system format (e.g. write-in-place). If a volume is restored using a point-in-time image, then corresponding VBNs in the extent-based segment becomes invalid and is resynced.

If the request is not for a point-in-time image, then at 536, the file system 312 determines whether the relevant extent-based segment VBNs are available (e.g. using hybrid file system manager 316). The extent-based segment VBNs may not be unavailable if, for example, a disk storing the relevant extent-based segment VBNs is in a degraded mode or because a block checksum indicates block-level corruption (e.g. due to a lost-write).

In the present example, the extent-based segment VBNs store an extent-based file system format version (e.g. an extent-based lazy replica) of the data stored in the log-structured segment. That is, the extent-based segment VBNs store a read-optimized version of the data stored in the log-structured segment VBNs, which is optimized for write operations. Accordingly, determining if the read-optimized version is available may include determining if the data was previously stored in the extent-based file system format, analyzing a bitmap, determining if the read-optimized version is up-to-date, determining if the read-optimized version is corrupt, determining if devices storing the read-optimized version is in degraded mode, determining if a checksum of the read-optimized version is valid, determining if one or more devices storing the read-optimized version is busy processing other operations, or a combination thereof.

If the relevant extent-based segment VBNs are not available, then the read operation is directed to the log-structured segment (e.g. a write out-of-place VBN space) at 534. The read operation is then completed using the data stored in the log-structured segment.

If the relevant extent-based segment VBNs are available, then at 538, the read operation is completed using the extent-based segment.

In one case, the relevant extent-based segment VBNs may not be available because the update bitmap 226 (or other meta-data) indicates that the relevant VBNs are invalid due to a pending updated. In that case, the process may further continue to 526 (in FIG. 5B) in order to update the relevant VBNs in the extent-based segment. The update may use data stored in volatile memory or in the log-structured segment. For example, the process may write to the storage subsystem 140 a read-optimized version of the data using the write-optimized version of the data.

In one exemplary embodiment, after a request is received at 530, the file system (e.g. the log-structured file system 312) first determines at 540 whether the requested file is stored in memory (e.g. the update volatile storage 334). If the file is stored in memory, then at 542, the read request is completed using the file stored in the memory. If the file is not stored in memory, then the process continues to 532 to determine whether the request is for a point-in-time image.

Thus, a file system having a hybrid file system format is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

As used herein, the term "data storage devices" refers to devices for storing data including, but not limited to, optical discs (e.g. CD-ROM, CD-R, CD-RW, DVD, DVD-R, DVD-RW, DVD+R, DVD+RW, DVD-RAM, Blu-ray, Minidisc), magnetic hard disks, holographic disks, floppy disks, ZIP disks, magnetic bubble memory, flash memory and/or memory cards (e.g. CompactFlash, Memory stick, Secure Ditigal, MMC, SmartMedia, xD and USB Keydrive), and tape storage.

What is claimed is:

1. A system comprising:
a storage subsystem having a plurality of mass storage devices, each of the plurality of mass storage devices having a first contiguous region and a second contiguous region, the storage subsystem including a single hybrid file system to store data in a log-structured file system format, in which a data block is written to a new physical location when it is modified, in the first contiguous region of a mass storage device of the storage subsystem and to store a replica of the data in an extent-based file system format, in which a data block is written to a physical location on which it was previously stored when it is modified, in the second contiguous region of the mass storage device, wherein the hybrid file system assigns a single file block number to the data, the file block number having a mapping to a first volume block number dictated by the log-structured file system format and a mapping to a second volume block number dictated by the extent-based file system format, and wherein the hybrid file system uses the mappings to determine whether to access the first volume block number or the second volume block number to fulfill a read request;
a memory including instructions for a hybrid file system manager; and
a processor, connected with the memory, to execute the instructions for the hybrid file system manager, wherein the instructions cause the processor to store the replica subsequent to changes in the data stored in the log-structured file system format in response to detecting that the data stored in the log-structured file system format exceeds a threshold of potential fragmentation, the instructions further to cause the processor to receive a read request for the data, to make a determination to read the data in the log-structured file system format if the replica is not stored in the extent-based file system format, and to make a determination to read the replica of the data in the extent-based file system format if the replica of the data is stored in the extent-based file system format.

2. The system of claim 1, further comprising the instructions to cause the processor to update the replica in response to a system condition which is independent of operations on the data stored in the log-structured file system format, wherein the system condition comprises at least one of: idling of a mass storage device storing at least a subset of the replica to be updated, imminent clearing of a volatile memory storing changes to the replica, receiving a request to read a non-updated portion of the replica or reaching a threshold number of operations waiting to update the replica.

3. The system of claim 1, wherein the data comprises a file, a subset of a file, a logical unit number, or a block.

4. The system of claim 1, further comprising a data structure to indicate data blocks to be modified to update the replica.

5. The system of claim 1, wherein the first region is an inner tracks region and the second region is an outer tracks region, and wherein the inner tracks region stores the data in the log-structured file system format and the outer tracks region stores the replica of the data in the extent-based file system format.

6. The system of claim 1, wherein the data stored in the log-structured file system format is parity protected, and wherein the replica of the data stored in the extent-based file system format is not parity protected.

7. The system of claim 1, wherein the first region is an outer tracks region and the second region is an inner tracks region, and wherein the outer tracks region stores the data in the log-structured file system format and the inner tracks region stores the replica of the data in the extent-based file system format.

8. A method of storing data comprising:
receiving data by a storage server that executes a hybrid file system, the hybrid file system having a log-structured file system format, in which a data block is written to a new physical location when it is modified, and an extent-based file system format, in which a data block is written to a physical location on which it was previously stored when it is modified;
assigning, by the storage server, a single file block number to the data, the file block number having a mapping to a first volume block number dictated by the first log-structured file system format and a mapping to a second volume block number dictated by the extent-based file system format;
storing data in the log-structured file system format in a first location associated with the first volume block number, the first location being in a first contiguous region of a mass storage device, and a replica of the data in the extent-based file system format in a second location associated with the second volume block number, the second location being in a second contiguous region of the mass storage device, wherein the extent-based file system format enables faster reads of the replica than the log-structured file system format enables reads of the data, and wherein the replica of the data is stored in the extent-based file system format upon detecting that the data in the log-structured file system format exceeds a threshold potential fragmentation;
asynchronously updating the replica following changes to the data stored in the first log-structured file system format;
receiving a request to read the data;
reading the data in the log-structured file system format if the replica is not stored in the extent-based file system format; and
reading the replica of the data in the extent-based file system format if the replica of the data is stored in the extent-based file system format.

9. The method of claim 8, wherein the threshold potential fragmentation is based on data indicating typical fragmentation of certain types of files.

10. The method of claim 8, wherein determining that the data has a threshold potential fragmentation comprises one or more of analyzing a user-defined data storage policy, determining whether the data comprises a certain type of data, determining whether the data is a database index file, or determining whether the data is an inode file.

11. The method of claim 8, further comprising identifying, in a bitmap, blocks in the second contiguous region to store the replica.

12. The method of claim 11, wherein asynchronously updating the replica following changes to the data stored in the log-structured file system comprises, in response to a system condition which is independent of operations on the data in the log-structured file system format, writing at least a subset of the replica to a subset of the blocks identified in the bitmap.

13. The method of claim 12, wherein the system condition comprises any one or more of idling of a mass storage device mapped to the subset of the blocks, imminent clearing of a volatile memory storing the subset of the replica, receiving a request to read at least a subset of the replica, or reaching a threshold number of operations waiting to write to the second storage space.

14. The method of claim 8, wherein updating the replica comprises processing at least a subset of write operations associated with the updating as a batch job.

15. The method of claim 8, further comprising deleting the replica when the replica reaches a predetermined age.

16. The method of claim 8, wherein the replica of the data in the extent-based file system format has no parity, compression or mirroring data protection.

17. A method of reading data comprising:
receiving a request to read data by a storage server that executes a hybrid file system, wherein the hybrid file system maintains first information in an extent-based file system format, in which a data block is written to a physical location on which it was previously stored when it is modified, in a first virtual block number space in a first contiguous region of a mass storage device and maintains second information in a log-structured file system format, in which a data block is written to a new physical location when it is modified, in a second virtual block number space in a second contiguous region of the mass storage device, wherein the first virtual block number space and the second virtual block number space are both mapped to a single file block number space, and wherein the first information is stored in the extent-based file system format upon detecting that the second information stored in the log-structured file system format exceeds a threshold potential fragmentation;
checking a volatile memory for the data by the storage server;
if the data is in the volatile memory, reading the data from the volatile memory;
if the data is not in the volatile memory, determining if an extent-based file system format version of the data is available in a storage subsystem;
if the extent-based version of the data is available, reading the extent-based version of the data; and
if the extent-based version of the data is not available, reading a log-structured version of the data stored in the storage subsystem.

18. The method of claim 17, wherein determining if the extent-based version is available comprises determining if the data was previously stored in the extent-based file system format, analyzing a bitmap, determining if the extent-based version is up-to-date, determining if the extent-based version is corrupt, determining if devices storing the extent-based version is in a degraded mode, determining if a checksum of the extent-based version is valid, determining if one or more devices storing the extent-based version is busy processing other operations, or a combination thereof.

19. The method of claim 17, further comprising, when the extent-based version of the data is not available, subsequently satisfying the request to read the data using the log-structured version of the data.

20. A method of updating data comprising:
receiving, by a storage server that executes a hybrid file system that maintains data in a log-structured file system format, in which a data block is written to a new physical location when it is modified, in a first contiguous region of a mass storage device on a storage subsystem and maintains a replica of at least a portion of the data in an extent-based file system format, in which a data block is written to a physical location on which it was previously stored when it is modified, in a second contiguous region of the mass storage device on the storage subsystem, an update of data stored in a first storage space of the first contiguous region associated with a first volume block number space in the log-structured file system format;
updating the data in the first storage space;
determining, by the storage server, if a replica of the data is stored in a second storage space of the second contiguous region associated with a second volume block number space in the extent-based file system format, wherein the first volume block number space and the second volume block number space are both mapped to a single file block number space;
when a replica of the data is stored in the second storage space, writing to a data structure to indicate blocks in the second storage space that are to be modified to propagate the update; and
in response to detecting a system condition which is independent of operations on the data stored in the log-structured file system format, modifying at least a subset of the blocks indicated in the data structure.

21. The method of claim 20, wherein modifying at least a subset of the blocks indicated in the data structure comprises performing write operations as a batch job.

22. The method of claim 20, further comprising, marking the blocks as invalid until the block is modified to propagate the update.

23. A storage server comprising:
a network interface through which to communicate with one or more clients over a network;
a storage interface through which to communicate with a mass storage device;
a processor to implement a hybrid file system to store data in the mass storage device, the hybrid file system including a log-structured file system format, in which a data block is written to a new physical location when it is modified, and an extent-based file system format, in which a data block is written to a physical location on which it was previously stored when it is modified; and
a memory storing instructions which, when executed by the processor, cause the server to perform a set of operations comprising:
storing data in the log-structured file system format in a first location in a first contiguous region of the mass storage device, the first location being associated with a first volume block number, wherein the first volume block number is mapped to a file block number;
storing a replica of the data in the extent-based file system format in a second location in a second contiguous region of the mass storage device, the second location being associated with a second volume block number, wherein the second volume block number is also mapped to the file block number, wherein the replica of the data is stored in the extent-based file system format upon determining that the data stored in the log-structured file system format exceeds a threshold potential fragmentation; and
asynchronously updating the replica following changes to the data stored in the first file system.

* * * * *